United States Patent
Navarro et al.

(10) Patent No.: US 10,424,973 B1
(45) Date of Patent: Sep. 24, 2019

(54) METHOD AND SYSTEM FOR WIRELESS POWER DELIVERY

(71) Applicant: Supply, Inc., Oakland, CA (US)

(72) Inventors: Gustavo Navarro, Oakland, CA (US); Varun Ramaswamy, Oakland, CA (US); Christopher Joseph Davlantes, Oakland, CA (US)

(73) Assignee: Supply, Inc., Oakland, CA (US)

( * ) Notice: Subject to any disclaimer, the term of this patent is extended or adjusted under 35 U.S.C. 154(b) by 0 days.

(21) Appl. No.: 16/295,684

(22) Filed: Mar. 7, 2019

Related U.S. Application Data (60) Provisional application No. 62/640,269, filed on Mar. 8, 2018, provisional application No. 62/729,860, filed on Sep. 11, 2018, provisional application No. 62/772,052, filed on Nov. 27, 2018, provisional application No. 62/772,425, filed on Nov. 28, 2018.

(51) Int. Cl.
*H02J 50/23* (2016.01)
*H02J 50/80* (2016.01)
*H02J 50/90* (2016.01)
*H02J 50/40* (2016.01)

(52) U.S. Cl.
CPC .............. *H02J 50/23* (2016.02); *H02J 50/40* (2016.02); *H02J 50/80* (2016.02); *H02J 50/90* (2016.02)

(58) Field of Classification Search
CPC combination set(s) only.
See application file for complete search history.

(56) References Cited

U.S. PATENT DOCUMENTS

| | | |
|---|---|---|
| 6,967,462 B1 | 11/2005 | Landis |
| 8,134,516 B1 | 3/2012 | Yaghjian et al. |
| 8,159,364 B2 | 4/2012 | Zeine |
| 8,175,660 B2 | 5/2012 | Porwal |
| 8,180,286 B2 | 5/2012 | Yamasuge |
| 8,338,991 B2 | 12/2012 | Von et al. |
| 8,766,544 B2 * | 7/2014 | Velazquez .......... H05B 37/0272 315/132 |
| 8,772,967 B1 | 7/2014 | Ikriannikov et al. |
| 9,142,990 B2 * | 9/2015 | Keeling ................. H01F 38/14 |
| 9,368,020 B1 | 6/2016 | Bell et al. |
| 9,425,629 B2 | 8/2016 | Kim et al. |
| 9,544,004 B2 | 1/2017 | Callaway et al. |
| 9,547,099 B2 * | 1/2017 | Shih ........................ G01V 3/10 |
| 9,608,454 B2 | 3/2017 | Sankar |
| 9,711,978 B2 | 7/2017 | Manova-Elssibony et al. |
| 9,853,486 B2 | 12/2017 | Liu et al. |

(Continued)

OTHER PUBLICATIONS

Brown, William C., "The history of power transmission by radio waves" IEEE Transactions on microwave theory and techniques 32, No. 9 (1984): 1230-1242.

(Continued)

*Primary Examiner* — Jared Fureman
*Assistant Examiner* — Michael J Warmflash
(74) *Attorney, Agent, or Firm* — Jeffrey Schox; Sam Rosenthal (57) ABSTRACT

A method for wireless power delivery, preferably including: determining transmitter-receiver proximity, assessing transmission parameters, and/or transmitting power based on a transmission plan. A system for wireless power delivery, preferably including a plurality of receivers and one or more transmitters.

21 Claims, 4 Drawing Sheets

(56) References Cited

U.S. PATENT DOCUMENTS

| | | |
|---|---|---|
| 9,859,757 B1 | 1/2018 | Leabman et al. |
| 9,876,380 B1 | 1/2018 | Leabman et al. |
| 9,882,427 B2 | 1/2018 | Leabman et al. |
| 9,893,555 B1 | 2/2018 | Leabman et al. |
| 9,967,462 B2 | 5/2018 | Kimura et al. |
| 2002/0111905 A1 | 8/2002 | Nagafuchi et al. |
| 2004/0203846 A1 | 10/2004 | Caronni et al. |
| 2005/0170788 A1 | 8/2005 | Tanaka et al. |
| 2006/0088123 A1 | 4/2006 | Jensen et al. |
| 2007/0156343 A1 | 7/2007 | Rayan et al. |
| 2007/0243851 A1 | 10/2007 | Shoarinejad et al. |
| 2008/0057880 A1 | 3/2008 | Copeland |
| 2009/0210366 A1 | 8/2009 | Sakata et al. |
| 2009/0284082 A1 | 11/2009 | Mohammadian |
| 2010/0033021 A1 | 2/2010 | Bennett |
| 2011/0141148 A1 | 6/2011 | Hill et al. |
| 2011/0156640 A1 | 6/2011 | Moshfeghi |
| 2011/0216564 A1 | 9/2011 | Swamy |
| 2011/0224817 A1 | 9/2011 | Dubrov et al. |
| 2011/0281535 A1 | 11/2011 | Low et al. |
| 2011/0282535 A1 | 11/2011 | Woody et al. |
| 2012/0217818 A1 | 8/2012 | Yerazunis et al. |
| 2012/0313450 A1 | 12/2012 | Nam et al. |
| 2013/0043734 A1 | 2/2013 | Stone et al. |
| 2013/0113299 A1 | 5/2013 | Von et al. |
| 2014/0028110 A1 | 1/2014 | Petersen et al. |
| 2014/0028111 A1 | 1/2014 | Hansen et al. |
| 2014/0062395 A1 | 3/2014 | Kwon et al. |
| 2014/0070621 A9 | 3/2014 | Von Novak et al. |
| 2014/0203769 A1* | 7/2014 | Keeling ............... H01F 38/14 320/108 |
| 2014/0239305 A1 | 8/2014 | Shah et al. |
| 2014/0361741 A1 | 12/2014 | Von et al. |
| 2014/0375253 A1 | 12/2014 | Leabman et al. |
| 2015/0123496 A1 | 5/2015 | Leabman et al. |
| 2015/0280444 A1 | 10/2015 | Smith et al. |
| 2015/0349542 A1* | 12/2015 | Yamamoto ............... G01V 3/10 307/104 |
| 2015/0357827 A1 | 12/2015 | Muratov et al. |
| 2015/0371771 A1 | 12/2015 | Abu Qahouq |
| 2016/0026625 A1 | 1/2016 | Walker |
| 2016/0054396 A1 | 2/2016 | Bell et al. |
| 2016/0087686 A1 | 3/2016 | Won et al. |
| 2016/0094092 A1 | 3/2016 | Davlantes et al. |
| 2016/0099611 A1 | 4/2016 | Leabman et al. |
| 2016/0140115 A1 | 5/2016 | Walker |
| 2016/0156268 A1 | 6/2016 | Thomas et al. |
| 2016/0197494 A1 | 7/2016 | Kwon et al. |
| 2016/0344431 A1 | 11/2016 | Srirattana et al. |
| 2018/0118045 A1* | 5/2018 | Gruzen ............... B60L 53/68 |
| 2018/0131413 A1 | 5/2018 | Won et al. |
| 2018/0352519 A1* | 12/2018 | Navarro ............ H04W 52/367 |

OTHER PUBLICATIONS

Harrington, Roger F, "Effect of Antenna Size on Gain, Bandwidth, and Efficiency", Journal of Research of the National Bureau of Standards—D. Radio Propagation vol. 64D, No. 1, Jan.-Feb. 1960., 12 pages.

Ivrlac, Michel T., "High-Efficiency Super-Gain Antenna Arrays", 2010 International ITG Workshop on Smart Antennas (WSA 2010), 369-374.

Kumar, et al., "Memetic search in differential evolution algorithm." In:arXiv preprint. Aug. 1, 2014 Retreived from <https://arxiv.org/ftp/arxiv/papers/1408/1408.0101.pdf> entire document.

International Search Report and Written Opinion for PCT Application No. PCT/US19/21151 dated May 17, 2019.

* cited by examiner

METHOD AND SYSTEM FOR WIRELESS POWER DELIVERY

CROSS-REFERENCE TO RELATED APPLICATIONS

This application claims the benefit of U.S. Provisional Application Ser. No. 62/640,269 filed on 8 Mar. 2018, U.S. Provisional Application Ser. No. 62/729,860 filed on 11 Sep. 2018, U.S. Provisional Application Ser. No. 62/772,052 filed on 27 Nov. 2018, and U.S. Provisional Application Ser. No. 62/772,425 filed on 28 Nov. 2018, each of which is herein incorporated in its entirety by this reference.

This application is related to U.S. patent application Ser. No. 16/001,725 filed 6 Jun. 2018, which is herein incorporated in its entirety by this reference.

TECHNICAL FIELD

This invention relates generally to the wireless power delivery field, and more specifically to a new and useful method and system in the wireless power delivery field.

BACKGROUND

Typical wireless power delivery systems restrict themselves to beamforming configurations, which may not offer high-performance results. Thus, there is a need in the wireless power delivery field to create a new and useful method and system for wireless power delivery.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
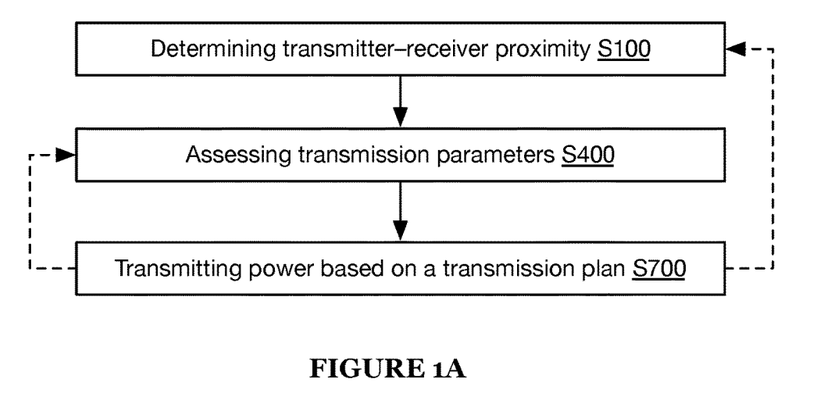
FIGS. 1A-1B are schematic representations of the method and an example of an element of the method.

A method for wireless power delivery preferably includes: determining transmitter-receiver proximity S100, assessing transmission parameters S400, and/or transmitting power based on a transmission plan S700 (e.g., as shown in FIGS. 1A and/or 3). A system for wireless power delivery preferably includes a plurality of receivers and one or more transmitters (e.g., as shown in FIGS. 2A-2D). However, the system and/or method can additionally or alternatively include any other suitable elements. The method is preferably performed using the system described above, but can additionally or alternatively be performed using any other suitable system(s).

Determining power transmission settings for efficient wireless power delivery using typical methods and systems can be difficult and/or time-intensive. Assessment of candidate power transmission settings can be a slow process (e.g., requiring 1-100 ms or more). In addition, the power transmission settings typically involve a large number of parameters, and so the search space can be very large, effectively precluding its full exploration. Further, the elements of the system and the surrounding element may move frequently, potentially invalidating prior solutions and necessitating a new search. In light of these problems, the inventors have discovered that a rapidly-determined solution (e.g., a solution resulting in power transmission within a threshold range of a limit or optimal result) can be superior to a globally-optimal solution found only after a lengthy search.

2. Benefits

The method can significantly reduce the time needed to determine acceptable and/or desirable power transmission settings. First, the method can include performing a local search or stochastic global search, which can typically find a sufficient solution in much less time than a deterministic global search. Further, the method can include performing multi-objective searches based only on the objective functions for subsets of the receivers (e.g., receiver groups such as pairs of receivers), which can typically find a sufficient solution in much less time than a multi-objective search based on objective functions for all such receivers (e.g., wherein a plurality of optimal configurations for different receiver groups can subsequently be employed to achieve satisfactory power delivery to many receivers), especially for large numbers of receivers (e.g., greater than a threshold number of receivers, such as 2, 3, 4, 5, 10, 5-10, 10-30, greater than 30, etc.). This search time reduction will often produce vastly superior energy transmission results (e.g., in a system with changing element orientations).

Second, evaluation of power transmission settings (e.g., during the local and/or global searches) can be time-consuming, such as due to the need to configure the transmitter according to the settings, measure (e.g., at the receiver or receivers) the result of power transmission using the settings, and/or communicate the results between different entities (e.g., transmit results from the receiver to the transmitter). To reduce such time consumption, the method can optionally include estimating and/or caching the evaluations (e.g., results) and/or associated information (e.g., both for the receiver or receivers currently under consideration, such as for which an optimization search is currently being performed, and for any other suitable receivers of the system, such as any other receivers with a wireless communication link to the transmitter), thereby allowing fast lookup of the estimated and/or cached values in place of full evaluation.

Third, employing power transmission optimization techniques (e.g., real-time optimization techniques, such as optimization over transmission parameters based on measured results associated with the parameters) can enable excitation and/or maintenance of supergaining behavior in receiver and/or transmitter antennas, despite potential changes in environment and/or system configuration. Further, use of pure-tone (and/or substantially pure-tone) signals for power transmission can make use of such supergaining antennas feasible, despite the narrow bandwidths (e.g., fractional impedance bandwidths) typically associated with such antennas (e.g., arising from the high-energy evanescent fields typically generated in and/or around such antennas). Supergaining antennas can exhibit much higher gain than typical antennas, thereby enabling, for example, increased power transmission rates and/or decreased receiver and/or transmitter sizes. However, the method and system can additionally or alternatively confer any other suitable benefits.

3. System

The transmitter(s) of the system preferably includes one or more transmission elements (e.g., elements configured to transmit electromagnetic radiation, such as RF and/or microwave power) such as transmission antennas. The antennas and/or other transmission elements can be narrowband elements (e.g., quality factor greater than a threshold, such as 50, 75, 100, 125, 150, 200, 250, 500, 30-100, 100-150, 150-300, 300-1000, or greater than 1000, etc.), broadband elements (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), and/or have any other suitable bandwidth. The transmission elements can optionally include one or more frequency adaptation elements (e.g., configured to control the transmission and/or resonance frequencies of the transmission elements). In some embodiments, the transmitter includes one or more elements such as described (e.g., regarding the transmitters of the system) in U.S. patent application Ser. No. 16/001,725, filed 6 Jun. 2018 and titled "Method and System for Wireless Power Delivery", which is herein incorporated in its entirety by this reference.

The transmission elements preferably include a plurality of controllable (e.g., adaptive) transmission elements (e.g., loops, monopoles, dipoles, etc.), such as phase- and/or amplitude-controllable elements. For example, the transmission elements can define one or more controllable (e.g., adaptive) antenna arrays (e.g., linear array, planar array, 3-D array, etc.; phased array, electronically controllable array, etc.).

The transmission elements preferably includes a plurality of active elements (e.g., elements, such as antennas, configured to be actively driven by feeds), more preferably independently controllable active antennas (e.g., wherein each active antenna can be individually controlled independent of all other active antennas of the system; wherein groups of active antennas can be controlled together, wherein each group is controllable independently from all other groups; etc.). In a first variation, the amplitude and/or phase at which each active antenna is driven can be independently controlled (e.g., via a separate IQ modulator or phase shifter for each active antenna). In a second variation, the active antennas are separated into one or more antenna groups, wherein the antennas of a group are controlled together (e.g., via a single IQ modulator or phase shifter for each group). For example, the antennas of a group can have a fixed phase offset (e.g., zero offset, such as wherein all antennas of the group have the same phase as each other; non-zero offset; etc.) with respect to each other (e.g., wherein the fixed phase offset is defined by differences in trace lengths between the IQ modulator or phase shifter and each antenna). However, the active antennas can additionally or alternatively be configured in any other suitable manner.

The transmission elements can additionally or alternatively include one or more passive antennas (e.g., configured to electrically and/or resonantly couple to one or more of the active antennas, thereby altering transmission characteristics of the transmitter). In one example, the system is configured to control (e.g., via switches, such as software-controlled switches; via elements with variable electrical properties, such as variable capacitors; etc.) electrical coupling (e.g., connection, resonant coupling, etc.) and/or decoupling of one or more of the passive antennas to one or more electrical components (e.g., passive components, such as resistors, capacitors, and/or inductors; antennas, such as one or more of the active antennas and/or other passive antennas; etc.). In a first example, a plurality of passive antennas can be electrically connected to and/or disconnected from each other (e.g., via switches operable to electrically connect two or more such antennas). In a second example, variable capacitors (e.g., varactors) and/or other variable (e.g., continuously-variable) elements are electrically coupled (e.g., electrically connected) to one or more passive antennas, enabling control of the loading of the passive antennas and/or their coupling to other antennas (e.g., other passive antennas, active antennas, etc.) in the array and/or their feeds (e.g., wherein varying the properties of one or more of the variable elements coupled to the antennas can function to control the net pattern of the array). In a specific example of this second example, an adaptive antenna array includes a single active antenna and a plurality of passive antennas, wherein one or more of the passive antennas are electrically coupled to one or more variable components.

Although referred to herein as antennas (e.g., active antennas, passive antennas, etc.), a person of skill in the art will recognize that the transmission elements can additionally or alternatively include transmission elements (e.g., active transmission elements, passive transmission elements, etc.) of any other suitable types. Although referred to herein as an antenna array, a person of skill in the art will recognize that the transmission elements can additionally or alternatively include arrays of any other suitable transmission elements and/or transmission elements in any other suitable arrangements (e.g., arrangements other than arrays, such as aperiodic arrangements).

The transmitter is preferably coupled to (e.g., electrically coupled to, such as connected by conductive wires; configured to receive power from; etc.) one or more power sources. The power sources can include remote power sources (e.g., power grid, external power generator, external power storage device, etc.) and/or power storage modules (e.g., wherein the power delivery device includes the power storage module(s)). The power storage module preferably includes a battery, more preferably a secondary battery but alternatively a primary battery, but can additionally or alternatively include a capacitor (e.g., to facilitate fast discharging in combination with a battery), a fuel cell with a fuel source (e.g., metal hydride), a thermal energy converter (e.g., thermionic converter, thermoelectric converter, mechanical heat engine, etc.) optionally with a heat source (e.g., radioactive material, fuel and burner, etc.), a mechanical energy converter (e.g., vibrational energy harvester), a solar energy converter, and/or any other suitable power source. The secondary battery can have a lithium phosphate chemistry, lithium ion polymer chemistry, lithium ion chemistry, nickel metal hydride chemistry, lead acid chemistry, nickel cadmium chemistry, metal hydride chemistry, nickel manganese cobalt chemistry, magnesium chemistry, or any other suitable chemistry. The primary battery can have a lithium thionyl chloride chemistry, zinc-carbon chemistry, zinc chloride chemistry, alkaline chemistry, oxy nickel hydroxide chemistry, lithium-iron disulfide chemistry, lithium-manganese oxide chemistry, zinc-air chemistry, silver oxide chemistry, or any other suitable chemistry.

However, the transmitter(s) can additionally or alternatively include any other suitable elements in any suitable arrangements.

The receivers of the system can include one or more antennas (e.g., configured to receive electromagnetic radiation transmitted by the transmitters). The receivers can optionally include and/or be electrically coupled to (e.g., configured to deliver electrical power to) one or more client devices (e.g., batteries and/or battery-containing devices, such as smart phones and/or other electrical and/or electronic user devices). The receivers can optionally include one or more buffer energy stores (e.g., batteries), such as a battery electrically coupled between the antenna(s) and the client device (e.g., between the antenna(s) and an electrical output configured to connect to the client device), which can function as a buffer between the antennas (which may provide power at an uneven rate and/or with uneven characteristics) and the client device (which may require and/or benefit from power provision at a substantially constant rate and/or with substantially constant characteristics, which may be temporarily disconnected from the receiver, etc.). In some embodiments, the receivers include one or more elements such as described (e.g., regarding the receivers of the system) in U.S. patent application Ser. No. 16/001,628, filed 6. Jun. 2018 and titled "System and Method for Wireless Power Reception", and/or in U.S. patent application Ser. No. 16/001,725, filed 6 Jun. 2018 and titled "Method and System for Wireless Power Delivery", each of which is herein incorporated in its entirety by this reference.

The antennas preferably function to receive power (e.g., electromagnetic radiation transmitted to the receiver, preferably propagating or "far-field" radiation but additionally or alternatively evanescent or "near-field" radiation) and to couple the received power into the receiver.

The antennas can include directional antennas, omnidirectional antennas, and/or any other suitable antennas. The antennas can include narrowband elements (e.g., quality factor greater than a threshold, such as 50, 75, 100, 125, 150, 200, 250, 500, 30-100, 100-150, 150-300, 300-1000, or greater than 1000, etc.), broadband elements (e.g., quality factor less than a threshold, such as 5, 10, 20, 30, 50, 75, 100, 125, 150, 1-5, 5-15, 15-30, 30-50, 50-100, 100-150, 150-300, 300-1000, or less than 1, etc.), and/or have any other suitable bandwidth. In some embodiments, some or all of the antennas of the transmitter (e.g., active antennas, passive antennas, etc.) and/or receiver include one or more tightly-coupled arrays of resonators, but can additionally or alternatively include a loosely-coupled array, a sparse array, a single resonator, and/or any other suitable antenna elements. The resonators can include resonant loops, cross-resonators, split-ring resonators, electro-inductive-capacitive resonators, other physically small resonators (e.g., small relative to their resonance wavelength), and/or any other suitable resonators. However, the resonators can be otherwise configured.

The antenna(s) can optionally include multiple arrays (and/or other resonator arrangements) arranged with different orientations, which can function to efficiently couple to radiation of different polarizations (e.g., orthogonal polarizations). In a first embodiment, an antenna includes parallel resonator layers (e.g., parallel resonator arrays), each layer having a different in-plane resonator orientation (e.g., orthogonal orientations, oriented at oblique angles, etc.). In a second embodiment, an antenna includes resonators on non-parallel planes (e.g., orthogonal planes, planes oriented at oblique angles, etc.). However, the antenna(s) can additionally or alternatively include any other suitable resonators and/or other antenna elements, and can have any other suitable arrangement. The antenna(s) can be a metamaterial or have any other suitable configuration.

Although referred to herein as antennas (e.g., active antennas, passive antennas, etc.), a person of skill in the art will recognize that the receiver antennas can additionally or alternatively include reception elements of any other suitable types.

The transmitters and receivers can additionally or alternatively be configured to transmit and/or receive energy in any other suitable form (e.g., sonic, optical, etc.), and/or to perform any other suitable role(s). In one embodiment, all or some of the transmitters can additionally function as receivers and/or all or some of the receivers can additionally function as transmitters. For example, the system can include a plurality of equivalent devices, each of which can wirelessly transmit power to and receive power from each of the other devices.

The transmitters and receivers preferably each include a wireless communication module, but can additionally or alternatively include wired communication modules or any other suitable communication modules, or can omit communication modules. The wireless communication modules preferably support (e.g., enable communication using) one or more wireless communication protocols (e.g., WiFi, Bluetooth, BLE, NFC, RF, IR, Zigbee, Z-wave, etc.). However, the transmitters and receivers can additionally or alternatively include any other suitable elements.

The transmitters and receivers preferably have an arbitrary and/or dynamic arrangement with respect to each other. In one example, the system includes a transmitter with a fixed position, and a plurality of receivers, each of which undergo numerous changes in position and orientation (e.g., with respect to the transmitter, each other, etc.) over time. The system can optionally be arranged in a setting in which other nearby objects (e.g., obstacles to wireless power transmission) can also have an arbitrary and/or dynamic arrangement with respect to the elements of the system. However, the system can define any other suitable arrangements.

For client devices with RF-sensitive components (e.g., sensitive electronics), one or more dissipative elements (e.g., dissipative to the RF power transmitted by the power delivery device) can optionally be placed near the RF-sensitive components (and/or any other elements for which it may be desirable to minimize the incident RF intensity). Such placement of dissipative elements may cause transmission optimization algorithms (e.g., as described below regarding the method) to avoid transmission conditions that create high RF intensity near the sensitive components and/or to implement transmission conditions that do not create high RF intensity near the sensitive components. Additionally or alternatively, negative-feedback receivers (e.g., in addition to the receiver(s) described above) can optionally be placed near the RF-sensitive components (and/or any other elements for which it may be desirable to minimize the incident RF intensity). Such negative-feedback receivers preferably include some or all of the elements described above regarding receivers (and/or share some elements, such as a wireless communication module, with the receiver coupled to the client device). For example, the negative-feedback receivers can be substantially identical to the receivers described above (e.g., except for identifiers and/or configurations, such as programming, indicative of and/or associated with their proximity to RF-sensitive components).

In some embodiments, the system includes one or more elements (and/or the entire system) such as described in U.S. patent application Ser. No. 16/001,725, filed 6. Jun. 2018 and titled "Method and System for Wireless Power Delivery", which is herein incorporated in its entirety by this reference. However, the system can additionally or alternatively include any other suitable elements in any suitable arrangement.

4. Method

4.1 Determining Transmitter-Receiver Proximity.

Determining transmitter-receiver proximity S100 can function to indicate an opportunity for wireless power delivery (e.g., from the transmitter to one or more receivers). S100 preferably includes determining a set of receivers that are in range of one or more transmitters (e.g., are in communication range with a transmitter, have established communications with a transmitter, are less than a threshold distance from a transmitter, are expected to be able to receive power from the transmitter at greater than a threshold rate, etc.). For example, S100 can include determining that one or more receivers are in transmission range (e.g., a range enabling efficient power transmission, substantial power transmission, any measurable power transmission, etc.) of the transmitter. Transmitter-receiver proximity is preferably determined using wireless communication (e.g., using the wireless communication modules of the transmitter and receiver). For example, one device can determine that the other is nearby based on establishment of wireless communication between them, wireless communication signal strength (e.g., RSSI), information communicated via wireless connection, and/or any other suitable indications.

Determining transmitter-receiver proximity S100 can additionally or alternatively include optical recognition (e.g., detecting a nearby receiver in an image captured by a camera of a transmitter), receiving a user input (e.g., button press), detecting a change in wireless power delivery, and/or any other suitable elements. For example, a transmitter wirelessly transmitting power to a first receiver can detect the arrival of a second receiver based on a reduction in power delivered to the first receiver.

S100 can additionally or alternatively include determining information about the receivers and/or transmitter(s). The information can include device type (e.g., model, serial number, etc.), power needs (e.g., battery charge state, current power draw, etc.), likely (e.g., typical, planned, predicted, etc.) residence time in proximity, likely position stability while in proximity (e.g., stationary on table, moving in user clothing pocket, etc.), device position (e.g., based on trilateration/triangulation, optical recognition, line-of-sight proximity sensor, device IMU readings, device GPS readings, etc.), and/or any other suitable information. However, S100 can additionally or alternatively include any other suitable elements or be otherwise performed.

4.2 Assessing Transmission Parameters.

Assessing transmission parameters S400 preferably functions to determine one or more transmission parameter value sets (transmission configurations) that can enable efficient power transmission (e.g., from the transmitters to the receivers). S400 is preferably performed in response to determining transmitter-receiver proximity S100, and can additionally or alternatively be performed in response to determining a change in transmission performance and/or needs. However, S400 can additionally or alternatively be performed at any other suitable time. The transmission parameters can include: transmission phase (e.g., relative to a reference phase, such as a transmission phase of a reference antenna) and/or transmission amplitude of one or more antennas, beamforming parameters such as beam orientation (e.g., angles describing the beam orientation, such as azimuthal angle and polar angle), other spatial parameters (e.g., positions and/or orientations of regions of high- and/or low-intensity excitation), supergaining excitation parameters such as supergaining receiver type, position, and/or orientation, passive antenna parameters such as resistance, capacitance, and/or inductance coupled to one or more antennas (e.g., electrical component coupling parameters), and/or any other suitable parameters. In a first example, the transmission parameters include transmission phase and/or amplitude for one or more active antennas and/or antenna groups (e.g., hardware-defined groups, software-defined groups, etc.), preferably for each active antenna of the transmitter (e.g., of the antenna array, such as the phased antenna array or other adaptive antenna array) or transmitters. In a second example, the transmission parameters include beamforming parameters associated with one or more beamforming networks (e.g., Rotman lens, Butler matrix, etc.) defined by the antennas (e.g., wherein one or more antenna groups, such as software-defined antenna groups, each define a separate beamforming network). In a third example, the transmission parameters include supergaining excitation parameters associated with one or more supergaining structures (e.g., antennas, arrays, etc.) defined by the antennas of the transmitter (e.g., wherein one or more antenna groups, such as hardware- and/or software-defined antenna groups, each define a separate supergaining structures) and/or receiver. However, the transmission parameters can additionally or alternatively include any other suitable parameters.

Assessing transmission parameters S400 can optionally include determining one or more antenna groups (e.g., software-defined antenna groups), which can be used to reduce the dimension of the transmission parameter space (e.g., a space defined by the transmission parameters, distinct from a physical space defined by object positions and/or orientations within a spatial region such as a room). For example, rather than independently controlling parameters (e.g., transmission phase and/or amplitude) associated with each active antenna, the dimension of the transmission parameter space can be reduced to parameters associated with each antenna group (e.g., transmission phase and/or amplitude, beamforming parameters, supergaining excitation parameters, etc.). In a first embodiment, the groups are predefined (e.g., based on properties of the transmitter; based on properties of fixed elements near the transmitter, such as for a transmitter installed in a fixed position; etc.). In a second embodiment, the groups are dynamically determined, such as based on statistical analysis and/or machine learning techniques (e.g., using data determined as described below, such as data associated with wireless power received at one or more receivers of the system). For example, principal component analysis and/or clustering techniques (e.g., k-means clustering, X-means clustering, spectral clustering, etc.) can be employed to determine the antenna groups (e.g., wherein highly correlated antennas and/or antenna parameters are grouped together, wherein antennas of a cluster are grouped together, etc.). However, the antenna groups can additionally or alternatively be determined in any other suitable manner, or no antenna groups can be determined.

Figure 1B:
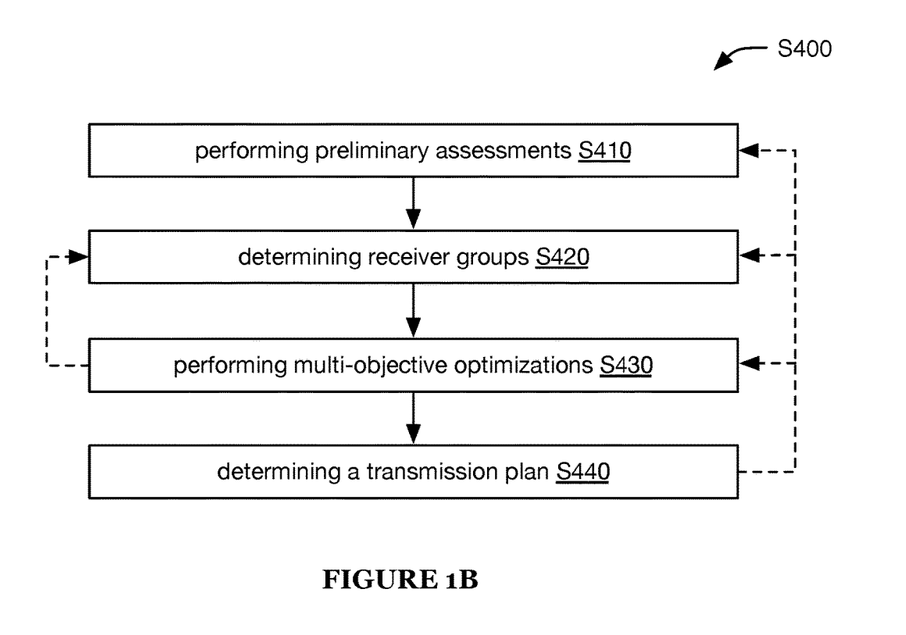
Figure 2A:
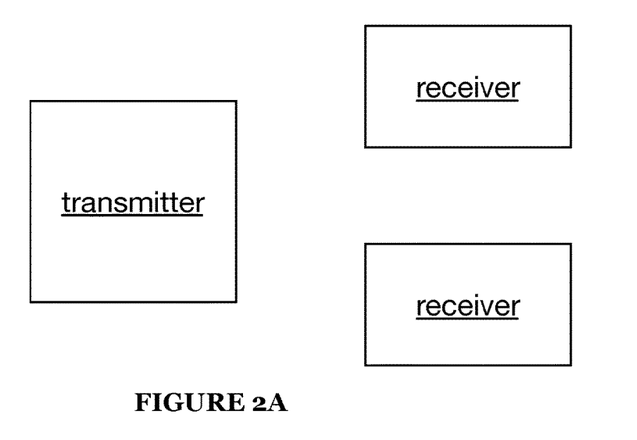
FIG. 2A is a schematic representation of a first embodiment of the system.
Figure 2B:
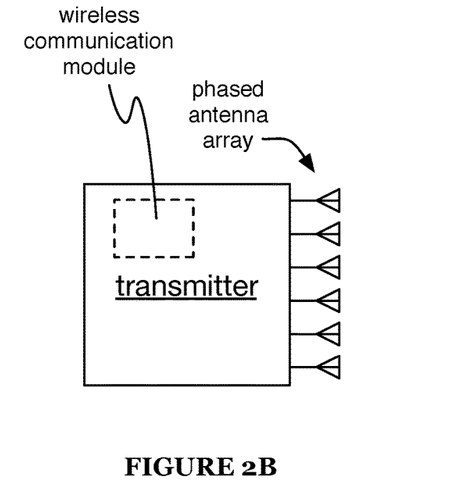
FIGS. 2B-2C are schematic representations of an example of a transmitter and receiver, respectively, of the system.
Figure 2C:
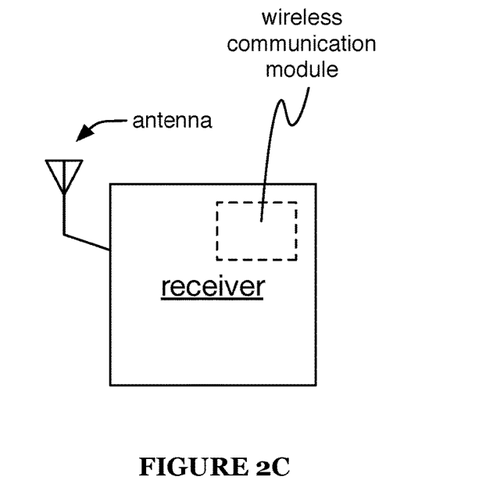
Figure 2D:
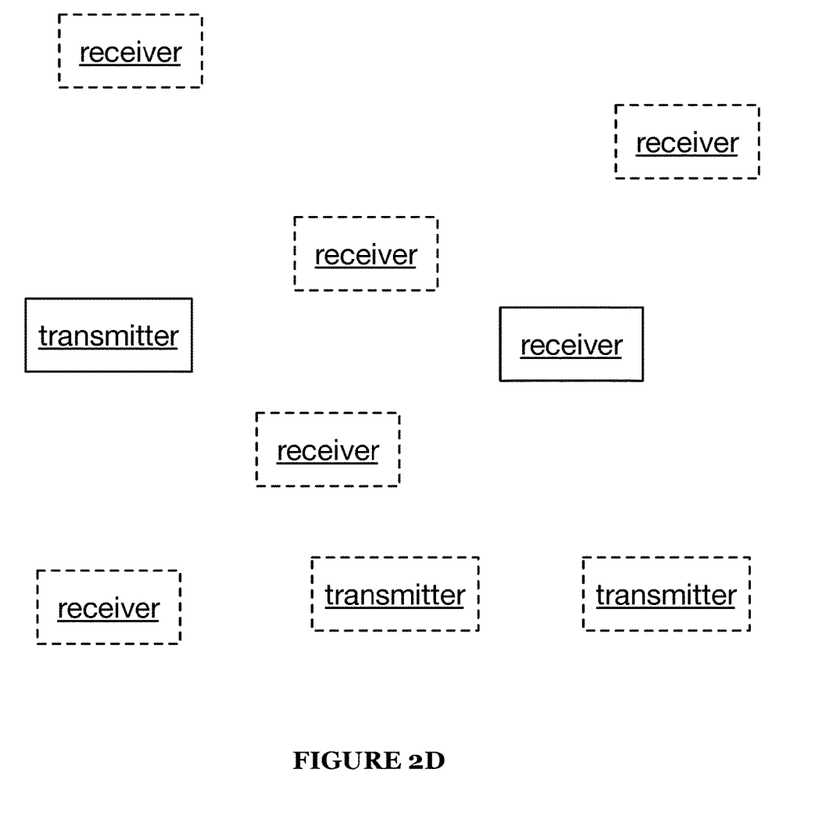
FIG. 2D is a schematic representation of a second embodiment of the system.
Figure 3:
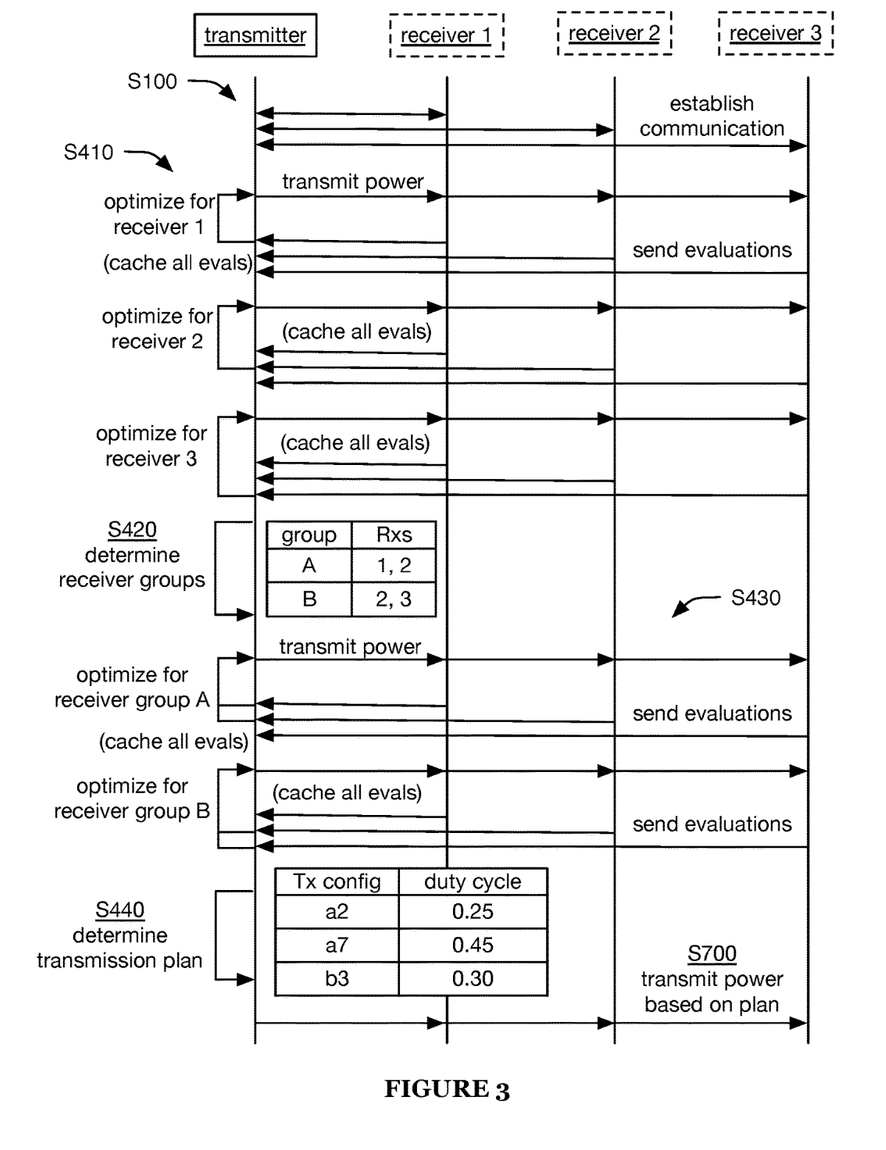
FIG. 3 is a flowchart representation of an example of the method.

S400 preferably includes performing preliminary assessments S410, determining receiver groups S420, performing multi-objective optimizations S430, and/or determining a transmission plan S440 (e.g., as shown in FIG. 1B). However, S400 can additionally or alternatively include assessing transmission parameters in any other suitable manner.

4.2.1 Performing Preliminary Assessments.

Performing preliminary assessments S410 preferably functions to determine a set of mappings between points in the transmission parameter space and the objective space (e.g., space representing power delivery to each receiver), more preferably including points that are close (in transmission parameter space) to one or more efficient transmission configurations for power delivery to one or more of the receivers. S410 is preferably performed in response to determining transmitter-receiver proximity S100, but can additionally or alternatively be performed at any other suitable time.

S410 preferably includes evaluating one or more transmission configurations. Each transmission configuration is preferably evaluated as described in in U.S. patent application Ser. No. 16/001,725, filed 6 Jun. 2018 and titled "Method and System for Wireless Power Delivery", which is herein incorporated in its entirety by this reference (e.g., as described regarding determining transmission parameter values S200, such as regarding evaluating candidate transmission parameter values S220 in particular), but can additionally or alternatively be evaluated in any other suitable manner. For each transmission configuration evaluated, S410 preferably includes determining and/or caching the corresponding objective space values (e.g., the power received at each receiver, such as at each receiver within communication range of the transmitter; values proportional to such power, such as power delivery efficiency, which may be calculated as power received at a receiver divided by a transmission power value such as transmitted power or power consumed by the transmitter; etc.).

In one example, S410 includes, for each receiver (e.g., each receiver in communication range of the transmitter), performing a search (e.g., a single-value objective function search) to determine the optimal transmitter configuration for that receiver. The search is preferably performed without consideration of the performance of any other receivers. However, information associated with the other receivers' (and/or any negative-feedback receivers') performance (e.g., power received by the other receivers) during the search is preferably determined and/or cached (e.g., for use in subsequent searches such as searches performed as part of S410, for use in determining receiver groups S420 and/or performing multi-objective optimizations S430, etc.). The search can be performed as described in U.S. patent application Ser. No. 16/001,725, filed 6 Jun. 2018 and titled "Method and System for Wireless Power Delivery", which is herein incorporated in its entirety by this reference (e.g., as described regarding determining transmission parameter values S200) and/or in any other suitable manner. In some embodiments, this search is limited to a local optimum search (e.g., as described in U.S. patent application Ser. No. 16/001,725 regarding performing a local optimum search S230), whereas in other embodiments, the search for some or all of the receivers may include a global optimum search (e.g., as described in U.S. patent application Ser. No. 16/001, 725 regarding performing a global optimum search S240).

Additionally or alternatively, performance of one or more other receivers can be considered during performance of this search. In examples, the objective function on which the search is based can be a function of the performance of multiple receivers (e.g., a multivariable function of the power received at each receiver and/or any other suitable multivariable function, such as described in U.S. patent application Ser. No. 16/001,725, filed 6 Jun. 2018 and titled "Method and System for Wireless Power Delivery", which is herein incorporated in its entirety by this reference), and/or the search can be a multi-objective search (e.g., wherein each objective function is associated with a different receiver or different receiver set). In variations in which the system includes one or more negative-feedback receivers (e.g., arranged in proximity to RF-sensitive components), power received at one or more negative-feedback receivers can be considered during performance of this search. For example, the objective function(s) can include one or more penalty terms associated with power delivery to one or more of the negative-feedback receivers (e.g., wherein the objective function value is improved by reducing power delivery to the negative-feedback receivers).

However, S410 can additionally or alternatively include performing preliminary assessments in any other suitable manner.

4.2.2 Determining Receiver Groups.

Determining receiver groups S420 preferably functions to determine one or more groups of receivers that may be able to (e.g., are expected to) perform well under the same transmission configuration. Preferably, for each receiver group, it is expected to be possible to determine a transmission configuration under which rapid and/or efficient power transmission (e.g., in excess of a threshold value) is achieved to each receiver of the respective group.

S420 preferably includes determining a set of receiver groups. Each group preferably includes a small number of receivers (e.g., 2 or 3 receivers) but can additionally or alternatively include larger numbers of receivers (e.g., 4, 5, 6-10, more than 10, etc.). The set of receiver groups preferably spans all the receivers (e.g., each receiver is included in at least one receiver group). The receiver groups can be disjoint or overlapping. In some examples, the number of receiver groups is greater than (e.g., much greater, than such as more than double, more than 10 times, etc.) the number of receivers (e.g., each receiver belongs to multiple receiver groups).

S420 is preferably performed in response to S410 (e.g., upon completion of S410), but can additionally or alternatively be performed at any other suitable time.

S420 is preferably performed based on the mappings determined in S410, such as the objective function values (e.g., power received at each receiver, power delivery efficiency to each receiver, etc.) for a particular transmission configuration. For example, S420 can be performed based on the objective function values for all the receivers (or a subset thereof) at the optimal transmission configuration for each receiver (e.g., the set of objective function values for all receivers under the optimal transmission configuration for receiver 1, the optimal transmission configuration for receiver 2, the optimal transmission configuration for receiver 3, etc.). S420 can additionally or alternatively be performed based on interpolated values (e.g., determined such as described below regarding S430). However, the receiver groups can additionally or alternatively be determined based on any other suitable information.

In a first embodiment, receiver groups are determined based on receivers that have optimal transmission configurations close to each other in parameter space. In a first example of this embodiment, all receivers for which the optimal transmission configurations are less than a threshold distance from each other (e.g. in transmission parameter space) are grouped. In a second example, a predetermined number of receivers (e.g., the desired number of receivers for each group, such as two or three receivers) are grouped based on the proximity of their optimal transmission configurations (e.g., each receiver is grouped with the receiver whose optimal transmission configuration is closest to its own optimal transmission configuration).

In a second embodiment, receivers with sufficient performance at a particular transmission configuration are grouped together. In a first variation of this embodiment, the receivers are grouped based on performance of the receivers under the optimal transmission configuration for a particular receiver. In a first example of this variation, the particular receiver is grouped with all other receivers (or a limited number of receivers, such as no more than one or two others) that exhibit performance above a threshold value at this transmission configuration. In a second example, the particular receiver is grouped with a specific number (e.g., predetermined number, such as 1 or 2) of other receivers (e.g., the best performing receivers at this transmission configuration). In a second variation, receiver performance at a transmission configuration under which multiple receivers perform substantially equally (e.g., within a threshold amount of each other, such as 1%, 5%, 10%, 25%, 100%, etc.) is considered, preferably limited to transmission configurations in which the receivers perform above a threshold minimum performance (e.g., threshold absolute amount; threshold relative amount, such as 10, 20, 50, 70, 80, 90, 90, 0-25, 25-60, 60-80, 80-95, or 95-100% of the optimal receiver performance; etc.). In this variation, receiver performance can be compared based on an absolute performance metric (e.g., received power) and/or a relative performance metric (e.g., each receiver compared to its performance under its own optimal transmission configuration). In this variation, the receivers that perform substantially equally preferably define a group.

In a third embodiment, the receiver groups are determined using one or more statistical and/or machine learning techniques, such as classification algorithms (e.g., clustering algorithms). The group determination (e.g., clustering) can be performed based on the optimal transmission configuration for each receiver, based on all known transmission configurations (e.g., all mappings determined during performance of S410), and/or based on any other suitable information. The clustering can be performed using, for example, k-means clustering, X-means clustering, spectral clustering, and/or any other suitable clustering techniques.

In a fourth embodiment, the receivers are grouped based on spatial considerations (e.g., wherein receivers near each other in the physical space are grouped together). The proximity of receivers to each other can be determined based on received signal strength indications (RSSI), spatial sensors (e.g., of the receivers, transmitter, auxiliary devices, etc.), imaging data (e.g., sampled by the receivers, transmitter, auxiliary devices, etc.), and/or any other suitable information (e.g., such as described above regarding determining transmitter-receiver proximity S100).

In a fifth embodiment, the groups are determined randomly. In a sixth embodiment, all possible receiver groups of a particular size (e.g., all pairs, all triplets, all groups of size 4, etc.) or sizes are used. In some examples, the receiver groups are determined such as described in U.S. Provisional Application Ser. No. 62/772,425 filed on 28 Nov. 2018, which is herein incorporated in its entirety by this reference.

S420 can optionally include removing one or more receivers (e.g., receivers for which a sufficiently high power delivery is difficult or impossible to achieve) from consideration, such as by not including the receiver in any receiver groups. For example, for each receiver (or a subset thereof), if no known transmission configuration achieves an objective function value (for the objective function associated with the receiver under consideration) greater than a threshold value (e.g., predetermined value; value relative to the receiver's power consumption and/or state of charge; value relative to the other objective function values, such as the average or lowest objective function maximum; etc.), the receiver can be removed from consideration. However, receivers can be additionally or alternatively removed from consideration based on any other suitable determination.

In some embodiments, S400 can optionally include determining receiver groups S420 during and/or after performing multi-objective optimizations S430 (e.g., based on the results of one or more of the multi-objective optimizations, such as the objective function values). For example, S420 can be repeated to revise the receiver groups (and/or determine new groups), such as based on the results of one or more preliminary multi-objective optimizations (e.g., wherein S430 is performed using lenient convergence criteria, performed for a short time or number of cycles, etc.). In a first specific example, in which a multi-objective optimization for group of three receivers fails to find suitable transmission configuration(s), one of the three receivers can be removed from the group (e.g., and added to a different group, such as a new or existing receiver group; and not be added to any other group; etc.). In a second specific example, in which the results of some multi-objective optimizations are indicative of a potentially-beneficial possible receiver group (e.g., in which the multi-objective optimizations evaluate one or more transmission configurations for which multiple receivers, such as receivers not currently assigned to the same group, both exhibit good performance and/or other objective function aspects such as described above regarding determining receiver groups based on the preliminary assessments), the possible receiver group can be added to the set of receiver groups (e.g., and the other groups can remain unchanged, and the receivers of the new group can be removed from one or more other groups, etc.).

However, S420 can additionally or alternatively include determining receiver groups in any other suitable manner, at any other suitable time, and/or based on any other suitable information.

4.2.3 Performing Multi-Objective Optimizations.

Performing multi-objective optimizations S430 preferably functions to determine a plurality of performant transmission configurations (e.g., configurations close to one or more Pareto fronts). S430 is preferably performed as described in U.S. patent application Ser. No. 16/001,725, filed 6 Jun. 2018 and titled "Method and System for Wireless Power Delivery", which is herein incorporated in its entirety by this reference (e.g., as described regarding using a multi-objective search approach). For example, S430 can include performing global optimum searches using one or more multi-objective search approaches.

For each receiver group (e.g., each group determined in S420), or for a subset of such groups, S430 preferably includes searching for transmission configurations on and/or near the Pareto front for the receivers of the group (e.g., irrespective of, but preferably determining and/or caching, information associated with performance of receivers not in the group under consideration). The Pareto front for a group of receivers is defined as the set of transmission configurations that are Pareto efficient (not Pareto-dominated by any other transmission configuration). For example, in a receiver group with two receivers (and thus including two objective functions: $f_i$ and $f_j$), a Pareto efficient configuration x is one for which there does not exist a configuration x' for which $f_i(x')>f_i(x)$ and $f_j(x')\geq f_j(x)$, nor for which $f_i(x')\geq f_i(x)$ and $f_j(x')>f_j(x)$. The set of transmission configurations on and/or near the Pareto front can be assessed based on one or more metrics, such as quality and/or diversity. For example, the quality of the set can be defined such that the quality is higher when the corresponding points in objective space are closer to the Pareto front (e.g., wherein distance to the Pareto front is determined based on the average distance taken over the set, average distance taken over the Pareto front, maximum distance taken over the set, etc.), preferably the true Pareto front but additionally or alternatively an approximation thereof and/or any other suitable Pareto front, and/or the diversity of the set can be defined such that the diversity is higher when the set is more evenly distributed along the Pareto front (e.g., the points in objective space, projected onto the front, are more uniformly spaced over the entire range of the Pareto front). However, the set can additionally or alternatively be assessed based on any other suitable metrics (and/or not be assessed).

Searching for the transmission configurations can include using one or more multi-objective search approaches, such as, for example, Pareto Simulated Annealing (PSA), Multi-objective Simulated Annealing (MOSA), Multi-objective Particle Swarm Optimization (MOPSO), Multi-objective Genetic Local Search (MOGLS), Modified Multi-objective Genetic Local Search (MMOGLS), Non-dominated Sorting Genetic Algorithm (NSGA), NSGA II, NSGA II C, Strength Pareto Evolutionary Algorithm (SPEA), Pareto memetic algorithm (PMA), IMMOGLS, SMOSA, UMOSA, and/or DMOSA.

In some embodiments, searching for these transmission configurations includes beginning with a set of transmission configurations for which the mapping to the objective space is known (e.g., determined in S410). The set preferably includes all known non-dominated points (known Pareto non-dominated points) in the transmission parameter space (e.g., a point for which a mapping to the objective space is known and which not Pareto-dominated by any other point for which a mapping to the objective space is known), for a set of objective functions (preferably, for each receiver of the group, including the objective function associated with that receiver). The known non-dominated points are not necessarily Pareto efficient, wherein no other point (whether or not its mapping to the objective space is known) dominates any of the known non-dominated points. Rather, the known non-dominated points are restricted to points for which none of the known points (points for which a mapping to the objective space is known) dominates any of the known non-dominated points. However, the set can alternatively include a subset of the known non-dominated points, and can additionally or alternatively include Pareto-dominated points (e.g., points that are Pareto-dominated by one or more other points for which a mapping to the objective space is known) and/or any other suitable points in the transmission parameter space. The set can additionally or alternatively include interpolated points (e.g., determined such as described below).

In these embodiments, the search preferably begins by using a high-diversity approach (e.g., PSA) to determine a plurality of transmission configurations with high diversity. The high-diversity approach can be performed for a predetermined number of iterations, for a predetermined run time, until a convergence criterion is satisfied (e.g., until a threshold number of non-dominated points have been determined, such as a sufficient number to approximate the Pareto front; until a sufficient diversity metric has been achieved by the set; etc.), and/or for any other suitable amount of time. Following the high-diversity approach, a high-quality approach (e.g., MOPSO) is preferably employed (e.g., starting from the transmission configurations found using the high-diversity approach) to find higher-quality transmission configurations (e.g., to find transmission configurations closer to the true Pareto front). The high-quality approach can be performed for a predetermined number of iterations, a predetermined run time, until a convergence criterion is satisfied (e.g., until a threshold quality metric has been achieved by the set), and/or for any other suitable time. These embodiments can optionally include repeating the high-diversity and/or high-quality approaches for one or more additional iterations (e.g., for each iteration, starting from the transmission configurations found using the previous search iteration). One example includes performing PSA, then MOPSO, then PSA again using the results from MOPSO. A second example includes alternating between PSA and MOPSO for a number of times (e.g., 2, 3, 4, or 5-10 iterations of each, etc.).

The search can optionally include using interpolation. Interpolation can be performed in place of, before, and/or after the high-diversity approach; preferably before the high-quality approach but additionally or alternatively after and/or in place of the high quality approach. The interpolation is preferably performed in the transmission parameter space and is preferably a piecewise interpolation (e.g., piecewise constant interpolation, piecewise linear interpolation, spline interpolation, etc.). The interpolation can be a constant interpolation, linear interpolation, polynomial interpolation, and/or any other suitable interpolation.

For each receiver group, S430 preferably determines a plurality of non-dominated transmission configurations (e.g., non-dominated when considering performance of receivers of that group only, and so based only on the objective functions associated with those receivers). Each of these pluralities preferably include the transmission configurations corresponding to the single receiver optima (e.g., optimum transmission configuration for each receiver of the group, such as determined in S410), but can alternatively exclude such configurations. However, S430 can additionally or alternatively include performing multi-objective optimizations in any other suitable manner.

4.2.4 Determining a Transmission Plan.

Determining a transmission plan S440 preferably functions to determine how power will be transmitted to the receivers. S440 is preferably performed in response to performing S430, but can additionally or alternatively be performed at any other suitable time. S440 preferably includes: determining desired power delivery S441, selecting a set of transmission configurations S442, and/or determining durations for the transmission configurations S443, but can additionally or alternatively include any other suitable elements.

Determining desired power delivery S441 preferably includes: for each receiver, determining a metric associated with desired power delivery to that receiver. The metric is preferably the total energy to be delivered, such as the energy needed to charge a battery (e.g., battery of a client device associated with the receiver) to a threshold value. The metric can alternatively be a power delivery metric, such as an average or minimum power to be delivered (e.g., average or minimum value equal to or greater than the expected average power consumption by devices powered by the receiver). However, the metric can alternatively be any other metric determined based on information such as device energy state and/or consumption, or can be any other suitable metric. The metric (and/or information for determining the metric) is preferably received (e.g., by the transmitter)

from the receiver (e.g., via wireless communications), but can additionally or alternatively be determined in any other suitable manner. S441 is preferably performed for each receiver (e.g., within communication range of the transmitter), but can additionally or alternatively be performed for any suitable set of receivers.

In embodiments in which the system includes one or more negative-feedback receivers, S441 can optionally include, for one or more negative-feedback receivers (preferably, for all such receivers), determining an associated metric (e.g., as described above). For example, the metrics associated with negative-feedback receivers can be maximum power (e.g., average power such as averaged over a thermal dissipation timeframe, instantaneous power, etc.) and/or total energy delivery values. However, S441 can additionally or alternatively include accounting for the negative-feedback receivers in any other suitable manner.

S441 can optionally include removing one or more receivers (e.g., receivers for which a sufficiently high power delivery is difficult or impossible to achieve) from consideration, such as by setting the associated metric to zero for such receivers. For example, for each receiver (or a subset thereof), if no known transmission configuration achieves an objective function value (for the objective function associated with the receiver under consideration) greater than a threshold value (e.g., predetermined value; value relative to the receiver's power consumption and/or state of charge; value relative to the other objective function values, such as the average objective function maximum, average objective function value over the pluralities of non-dominated transmission configurations or a subset thereof such as the subset determined based on the objective function, lowest objective function maximum, lowest objective function value over the pluralities of non-dominated transmission configurations or a subset thereof such as the subset determined based on the objective function; etc.), the receiver can be removed from consideration. However, S441 can additionally or alternatively include determining the metrics in any other suitable manner.

Selecting a set of transmission configurations S442 preferably includes selecting from the pluralities of non-dominated transmission configurations determined in S430 (e.g., each plurality associated with a different receiver group). S442 preferably includes selecting a subset of these configurations. For example, S442 can include selecting a threshold number (e.g., 1, 2, 3, 4-9, 10-30, 30-100, etc.) of transmission configurations from each plurality. In a specific example, S442 includes selecting a single transmission configuration from each plurality.

Selecting a subset (e.g., optimal subset) from the pluralities of non-dominated transmission configurations can include performing an optimization search (e.g., to determine the optimal subset), wherein the optimal subset is preferably the subset associated with the optimal transmission plan (e.g., the subset of configurations for which the optimal transmission plan specifies a non-zero charging time and/or duty cycle). Performing the search preferably includes assessing candidate subsets (e.g., evaluating an objective function based on the candidate subsets). To assess a candidate subset, power transmission durations for the candidate subset can be determined (e.g., as described below regarding S443), wherein a candidate subset metric can be determined based on these durations (e.g., sum of the durations). For example, the optimization goal of the search can be to minimize the total charging time (e.g., time needed to achieve the desired energy delivery to all of the receivers). The search can be performed (e.g., based on the candidate subset metrics) using one or more discrete optimization algorithms, such as a grid search (e.g., adaptive grid search), hill climbing algorithm, discrete evolutionary algorithm, and/or any other suitable algorithms. In embodiments in which the system includes one or more negative-feedback receivers, the search can optionally be constrained based on the negative-feedback receiver metrics (e.g., wherein the maximum threshold power and/or energy is not exceeded). However, the optimal subset can additionally or alternatively be determined in any other suitable manner (or any other suitable subset can be selected).

Alternatively, S442 can include selecting all non-dominated transmission configurations (e.g., not excluding any such configurations from consideration).

Determining durations for the transmission configurations S443 is preferably performed for a subset of transmission configurations (e.g., the optimal subset selected in S442, a candidate subset being considered during the search for the optimal subset performed in S442, etc.). S443 preferably includes solving a linear programming problem.

For this problem, the constraint is preferably to deliver a desired amount of energy to each receiver (e.g., based on the desired power delivery determined in S441). For example, the constraint for each receiver can be expressed as $$\sum_j t_j f_i(y_j) \geq E_i$$

wherein the each $y_j$ represents a transmission configuration of the subset being considered, $f_i(y_j)$ represents power delivered to receiver i under transmission configuration $y_j$, $E_i$ represents the minimum total energy to be delivered to receiver i, and $t_j$ represents the time duration for which transmission should be conducted under transmission configuration $y_j$ (the time duration solved for by performing S443); preferably wherein the sum is taken over all transmission configurations of the subset, but alternatively wherein the sum is taken over only the transmission configurations (of the subset) for which the associated set of receivers includes receiver i, and/or over any other suitable transmission configurations. In embodiments in which one or more receivers are associated with priority states (e.g., priority categories such as high, medium, or low charging priority; priority ranking; numeric priority score; etc.), the constraint can optionally be altered based on the priority state. For example, the constraint can be altered such that the resulting transmission plan will prioritize power delivery to the higher-priority receivers, even if the total transmission time to satisfy all receivers' metrics will be increased (e.g., wherein, as compared with an unaltered constraint, the transmission time required to satisfy the high-priority receivers is reduced but the transmission time required to satisfy the low-priority receivers is increased). In embodiments in which the system includes one or more negative-feedback receivers, the linear programming problem can additionally or alternatively be constrained based on the negative-feedback receiver metrics (e.g., wherein the maximum threshold power and/or energy is not exceeded).

The objective of the linear programming problem is preferably to minimize the total transmission time needed to satisfy the constraints (e.g., the sum of the individual durations, $t_{total} = \Sigma_j t_j$). The linear programming problem can be solved using one or more Simplex algorithms, criss-cross algorithms, interior point methods (e.g., path following methods, ellipsoid methods, Karmarkar's algorithm, Affine scaling methods, Mehrotra predictor-corrector method, etc.), column generation algorithms, and/or any other suitable linear programming approaches.

However, S443 can additionally or alternatively include determining the durations by optimizing a nonlinear function of the durations (or a subset thereof) and/or in any other suitable manner.

S440 preferably includes determining a transmission plan, wherein the plan is preferably indicative of (e.g., includes) the optimal subset (e.g., selected in S442) and, for each transmission configuration of the optimal subset, the associated transmission duration (e.g., determined in S443) and/or duty cycle (e.g., determined based on the transmission duration, such as equal to the transmission duration for the associated transmission configuration divided by the sum of all the transmission durations). However, S440 can additionally or alternatively include determining any other suitable transmission plan in any suitable manner.

4.3 Transmitting Power Based on the Transmission Plan.

Transmitting power based on the transmission plan S700 can function to wirelessly deliver power to the receiver. Power is preferably transmitted S700 in response to assessing transmission parameters S400 (e.g., in response to determining the transmission plan S440), but can additionally or alternatively be performed at any other suitable time. Power is preferably transmitted S700 throughout the receivers' residence time within range of the transmitter, but can additionally or alternatively be transmitted intermittently, according to a schedule, based on the receiver operation parameters (e.g., state of charge), and/or with any other suitable timing.

S700 preferably includes cycling through the transmission configurations indicated by the plan (e.g., the optimal subset of configurations), more preferably wherein such cycling is time-weighted as indicated by the plan (e.g., in proportion to the associated durations and/or duty cycles). For example, the configurations can be cycled through at a predetermined total cycle frequency, each duration can be divided (e.g., equally divided) into a predetermined number of time slices, and/or the configurations can be cycled through at any other suitable rate. Alternatively, the configurations can be cycled through without time-weighting (and/or any other suitable time-weighting), such as wherein a configuration is eliminated from the cycle once the desired duration has elapsed. However, S700 can additionally or alternatively include transmitting under any other suitable transmission configurations for any suitable periods of time.

The power is preferably transmitted as one or more pure-tone (or substantially pure-tone, such as defining a bandwidth less than a threshold bandwidth) signals (e.g., which can be beneficial in embodiments that employ one or more supergaining structures and/or other narrow bandwidth antennas), but can additionally or alternatively be transmitted in any other suitable form (e.g., in embodiments that employ wider-bandwidth antennas, in embodiments in which communication signals are transmitted along with the power, etc.). In a first specific example, the radiation has a GHz-scale frequency (e.g., 5-100 GHz, such as 5.8 GHz and/or greater than 5.8 GHz). In a second specific example, the radiation has a hundreds of MHz-scale frequency (e.g., 100-500 MHz, such as 433 MHz and/or less than 433 MHz; 700-1100 MHz, such as 806-821 MHz, 851-870 MHz, 896-902 MHz, 902-928 MHz, and/or 935-941 MHz; etc.). However, the power can additionally or alternatively be received in any other suitable form.

S400 (or one or more elements thereof) can optionally be repeated during power transmission S700 (e.g., wherein power transmission is temporarily halted during transmission parameter reassessment). Repeated performances of S400 preferably use the most recently determined transmission configurations as initial values, but can additionally or alternatively use any other suitable values (e.g., as done during the initial performance of S400, using other previously-determined values, etc.). S400 can be repeated in response to detecting a change (e.g., greater than an absolute or relative threshold) in delivered power, detecting movement (e.g., based on receiver and/or transmitter measurements, such as IMU measurements), detecting an additional receiver and/or transmitter in proximity to the system S100, determining a change in desired power delivery (e.g., based on updated battery charge information) to one or more receivers (e.g., repeating S440 in response to such a change), receiving a user input, can be repeated periodically (e.g., at a predetermined rate; at a dynamically-determined rate, such as determined based on an observed and/or expected temporal and/or spatial stability of the system and/or its performance, preferably wherein lower stability corresponds to a more rapid rate; etc.), sporadically, randomly, and/or can be repeated at any other suitable time. However, power can be transmitted S700 in any other suitable manner, and the method can additionally or alternatively include any other suitable elements performed in any other suitable manner.

Although omitted for conciseness, the preferred embodiments include every combination and permutation of the various system components and the various method processes. Furthermore, various processes of the preferred method can be embodied and/or implemented at least in part as a machine configured to receive a computer-readable medium storing computer-readable instructions. The instructions are preferably executed by computer-executable components preferably integrated with the system. The computer-readable medium can be stored on any suitable computer readable media such as RAMs, ROMs, flash memory, EEPROMs, optical devices (CD or DVD), hard drives, floppy drives, or any suitable device. The computer-executable component is preferably a general or application specific processing subsystem, but any suitable dedicated hardware device or hardware/firmware combination device can additionally or alternatively execute the instructions.

The FIGURES illustrate the architecture, functionality and operation of possible implementations of systems, methods and computer program products according to preferred embodiments, example configurations, and variations thereof. In this regard, each block in the flowchart or block diagrams may represent a module, segment, step, or portion of code, which comprises one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the preferred embodiments of the invention without departing from the scope of this invention defined in the following claims.

We claim:

1. A method for wireless power transmission, comprising:
   determining a receiver group comprising a first receiver and a second receiver;
   in response to determining the receiver group, determining a plurality of transmission parameter sets based on:
      a first objective function associated with the first receiver; and
      a second objective function associated with the second receiver;
   wherein determining the plurality of transmission parameter sets comprises, for each transmission parameter set of the plurality: evaluating the first and second objective functions based on the respective transmission parameter set;
   determining a charging plan based on the evaluations of the first and second objective functions, the charging plan comprising:
      a first transmission parameter set of the plurality;
      a first duty cycle associated with the first transmission parameter set;
      a second transmission parameter set; and
      a second duty cycle associated with the second transmission parameter set; and
   at a transmitter, wirelessly transmitting power to the first and second receivers based on the charging plan;
   wherein evaluating the first and second objective functions based on the respective transmission parameter set comprises:
      at the transmitter, throughout a respective time interval, transmitting power based on the respective transmission parameter set;
      at the first receiver, during the respective time interval, receiving power transmitted by the transmitter;
      determining a respective first amount of power received at the first receiver during the respective time interval;
      evaluating the first objective function based on the respective first amount of power;
      at the second receiver, during the respective time interval, receiving power transmitted by the transmitter;
      determining a respective second amount of power received at the second receiver during the respective time interval; and
      evaluating the second objective function based on the respective second amount of power.

2. The method of claim 1, wherein transmitting power wirelessly based on the charging plan comprises:
   transmitting based on the first transmission parameter set throughout a first time interval; and
   transmitting based on the second transmission parameter set throughout a second time interval;
   wherein a duration ratio of a first time interval duration to a second time interval duration is substantially equal to a duty cycle ratio of the first duty cycle to the second duty cycle.

3. The method of claim 1, wherein the plurality of transmission parameter sets comprises the second transmission parameter set.

4. The method of claim 1, further comprising:
   determining a second receiver group comprising a third receiver; and
   in response to determining the second receiver group, determining a second plurality of transmission parameter sets based on a third objective function associated with the third receiver;
wherein:
   the second plurality of transmission parameter sets comprises the second transmission parameter set; and
   the charging plan is determined based further on the evaluations of the third objective function.

5. The method of claim 4, wherein:
   the second receiver group further comprises a fourth receiver;
   second plurality of transmission parameter sets is determined based further on a fourth objective function associated with the fourth receiver; and
   the charging plan is determined based further on the evaluations of the third and fourth objective functions.

6. The method of claim 4, wherein the second receiver group further comprises the second receiver.

7. The method of claim 1, further comprising:
   determining a first delivered energy target quantity associated with the first receiver; and
   determining a second delivered energy target quantity associated with the second receiver;
wherein the charging plan is determined based further on the first and second delivered energy target quantities.

8. The method of claim 7, wherein determining the charging plan comprises using a discrete optimization algorithm to minimize an expected power transmission time required to meet the first and second delivered energy target quantities.

9. The method of claim 1, wherein the plurality of transmission parameter sets defines a Pareto non-dominated set for the first and second objective functions.

10. The method of claim 9, wherein determining the plurality of transmission parameter sets further comprises performing a search based on the first and second objective functions and a Pareto simulated annealing algorithm.

11. The method of claim 10, wherein the search is performed based further on a multi-objective particle swarm optimization algorithm.

12. The method of claim 1, wherein:
   the transmitter comprises a plurality of transmission elements; and
   a transmission parameter space associated with the plurality of transmission parameter sets comprises, for each transmission element of the plurality, at least one of: a respective phase parameter and a respective amplitude parameter.

13. A method for wireless power transmission, comprising:
   determining a first receiver group comprising a first receiver and a second receiver;
   determining a second receiver group comprising a third receiver;
   in response to determining the first receiver group, determining a first plurality of transmission parameter sets based on:
      a first objective function associated with the first receiver; and
      a second objective function associated with the second receiver;
   wherein determining the first plurality of transmission parameter sets comprises, for each transmission parameter set of the first plurality: evaluating the first and second objective functions based on the respective transmission parameter set;
   in response to determining the second receiver group, determining a second plurality of transmission parameter sets based on a third objective function associated with the third receiver; wherein determining the third plurality of transmission parameter sets comprises, for each transmission parameter set of the second plurality:
evaluating the third objective function based on the respective transmission parameter set;
determining a charging plan based on the evaluations of the first, second, and third objective functions, the charging plan comprising:
a first transmission parameter set of the first plurality;
a first duty cycle associated with the first transmission parameter set;
a second transmission parameter set of the second plurality; and
a second duty cycle associated with the second transmission parameter set; and
at a transmitter, wirelessly transmitting power to the first and second receivers based on the charging plan.

14. The method of claim 13, wherein evaluating the first and second objective functions based on the respective transmission parameter set comprises:
at the transmitter, throughout a respective first time interval, transmitting power based on the respective transmission parameter set;
at the first receiver, during the respective first time interval, receiving power transmitted by the transmitter;
determining a respective first amount of power received at the first receiver during the respective first time interval;
evaluating the first objective function based on the respective first amount of power;
at the second receiver, during the respective first time interval, receiving power transmitted by the transmitter;
determining a respective second amount of power received at the second receiver during the respective first time interval; and
evaluating the second objective function based on the respective second amount of power.

15. The method of claim 14, wherein:
the first objective function is proportional to the first amount of power; and
the second objective function is proportional to the second amount of power.

16. The method of claim 13, wherein:
the second receiver group further comprises the first receiver; and
the second plurality of transmission parameter sets is determined based further on the first objective function.

17. The method of claim 16, wherein:
the first plurality of transmission parameter sets defines a Pareto non-dominated set for the first and second objective functions; and
the second plurality of transmission parameter sets defines a Pareto non-dominated set for the first and third objective functions.

18. The method of claim 13, wherein:
the second receiver group further comprises a fourth receiver; and
the second plurality of transmission parameter sets is determined based further on a fourth objective function associated with the fourth receiver.

19. The method of claim 13, wherein determining the first receiver group comprises:
performing a first optimum search, based on the first objective function, over a transmission parameter space associated with the first and second pluralities of transmission parameter sets;
based on the first optimum search, determining a first optimized parameter value set;
performing a second optimum search, based on the second objective function, over the transmission parameter space;
based on the second optimum search, determining a second optimized parameter value set;
performing a third optimum search, based on the third objective function, over the transmission parameter space;
based on the third optimum search, determining a third optimized parameter value set;
determining a first distance, in the transmission parameter space, between the first and third optimized parameter value sets;
determining a second distance, in the transmission parameter space, between the second and third optimized parameter value sets;
determining a third distance, in the transmission parameter space, between the first and second optimized parameter value sets;
determining that the third distance is the shortest distance of the first, second, and third distances; and
based on determining that the third distance is the shortest distance, selecting the first and second receivers for the first receiver group.

20. The method of claim 13, wherein determining the first receiver group comprises:
performing an optimum search, based on the first objective function, over a transmission parameter space associated with the first and second pluralities of transmission parameter sets;
based on the optimum search, determining an optimized parameter value set;
evaluating the second and third objective functions based on the optimized parameter value set, wherein a second objective function value exceeds a third objective function value;
based on the second objective function value exceeding the third objective function value, selecting the first and second receivers for the first receiver group.

21. A system for wireless power transmission, comprising a transmitter comprising a plurality of transmission elements, the transmitter configured to:
determine a receiver group comprising a first receiver and a second receiver;
in response to determining the receiver group, determine a plurality of transmission parameter sets based on:
a first objective function associated with the first receiver; and
a second objective function associated with the second receiver;
wherein determining the plurality of transmission parameter sets comprises, for each transmission parameter set of the plurality: evaluating the first and second objective functions based on the respective transmission parameter set;
determine a charging plan based on the evaluations of the first and second objective functions, the charging plan comprising:
a first transmission parameter set of the plurality;
a first duty cycle associated with the first transmission parameter set;
a second transmission parameter set; and
a second duty cycle associated with the second transmission parameter set; and control the plurality of transmission elements to transmit based on the charging plan;
wherein evaluating the first and second objective functions based on the respective transmission parameter set comprises:
- at the transmitter, throughout a respective time interval, controlling the plurality of transmission elements to transmit power based on the respective transmission parameter set;
- at the first receiver, during the respective time interval, receiving power transmitted by the transmitter;
- determining a respective first amount of power received at the first receiver during the respective time interval;
- evaluating the first objective function based on the respective first amount of power;
- at the second receiver, during the respective time interval, receiving power transmitted by the transmitter;
- determining a respective second amount of power received at the second receiver during the respective time interval; and
- evaluating the second objective function based on the respective second amount of power.

* * * * *

UNITED STATES PATENT AND TRADEMARK OFFICE
CERTIFICATE OF CORRECTION

| | |
|---|---|
| PATENT NO. | : 10,424,973 B1 |
| APPLICATION NO. | : 16/295684 |
| DATED | : September 24, 2019 |
| INVENTOR(S) | : Gustavo Navarro, Varun Ramaswamy and Christopher Joseph Davlantes |

It is certified that error appears in the above-identified patent and that said Letters Patent is hereby corrected as shown below:

In the Claims

Column 19, Line 16, after "plurality:", insert --¶--
Column 20, Line 61, after "plurality:", insert --¶--
Column 20, Line 67, after "receiver;", insert --¶--
Column 22, Line 56, after "plurality:", insert --¶--

Signed and Sealed this
Twenty-fifth Day of February, 2020

Andrei Iancu
*Director of the United States Patent and Trademark Office*